US010208975B2

(12) United States Patent
Azevedo et al.

(10) Patent No.: US 10,208,975 B2
(45) Date of Patent: Feb. 19, 2019

(54) SMART PET-CRATE WITH INTERACTIVE FEATURES (71) Applicant: Plug and Play Robotics, LLC, Ft. Lauderdale, FL (US)

(72) Inventors: Jonathan Azevedo, Fort Lauderdale, FL (US); Christopher Lightcap, Boynton Beach, FL (US)

(*) Notice: Subject to any disclaimer, the term of this patent is extended or adjusted under 35 U.S.C. 154(b) by 88 days.

(21) Appl. No.: 15/267,610

(22) Filed: Sep. 16, 2016

(65) Prior Publication Data
US 2017/0097169 A1 Apr. 6, 2017

Related U.S. Application Data (60) Provisional application No. 62/236,122, filed on Oct. 1, 2015.

(51) Int. Cl.
*F24F 11/30* (2018.01)
*A01K 1/03* (2006.01)
*A01K 1/00* (2006.01)
*G05B 15/02* (2006.01)
*H05B 37/02* (2006.01)
*F24F 120/10* (2018.01)

(52) U.S. Cl.
CPC ............ *F24F 11/30* (2018.01); *A01K 1/0047* (2013.01); *A01K 1/033* (2013.01); *G05B 15/02* (2013.01); *H05B 37/0218* (2013.01); *H05B 37/0227* (2013.01); *F24F 2120/10* (2018.01); *Y02B 20/46* (2013.01); *Y02B 20/48* (2013.01)

(58) Field of Classification Search
CPC .... F24F 11/30; F24F 2120/10; F24F 11/0034; A01K 1/033; A01K 1/0047; G05B 15/02; H05B 37/0209
See application file for complete search history.

(56) References Cited

U.S. PATENT DOCUMENTS

| 442,836 | A | 12/1890 | Tanzer |
| 1,217,796 | A | 2/1917 | McFarland |
| D182,838 | S | 5/1958 | Lubberts et al. |
| D214,673 | S | 7/1969 | Thorn et al. |
| D326,376 | S | 5/1992 | Barfield |
| D330,443 | S | 10/1992 | Darby |
| D334,444 | S | 3/1993 | Darby |
| D461,972 | S | 8/2002 | Everett |
| D554,389 | S | 11/2007 | Pierce et al. |

(Continued)

*Primary Examiner* — Nathan L Laughlin
(74) *Attorney, Agent, or Firm* — Meunier Carlin & Curfman LLC (57) ABSTRACT A smart pet-crate is disclosed. The smart pet-crate provides a den-like habitat for an animal and is configured with electronics that include sensors to detect aspects of the animal's environment and environmental conditioners to adjust the environment within the pet crate in response to the detected aspects. The conditioned environment within the pet crate will provide comfort to the animal, which may help to reduce the animal's fear/anxiety. The smart pet-crate may be communicatively coupled to a body sensor worn by the animal and a computing device used by a human to form a pet care system, allowing for remote control of the pet crate and interaction with the animal. For the particular embodiment of a smart music playing pet crate, a method for selecting songs from a playlist based on sensing and computing the animal's preferences is also disclosed.

9 Claims, 7 Drawing Sheets (56) References Cited

U.S. PATENT DOCUMENTS

| | | | | |
|---|---|---|---|---|
| 2005/0241593 | A1* | 11/2005 | Kaura | A01K 1/0035 |
| | | | | 119/496 |
| 2006/0011144 | A1* | 1/2006 | Kates | A01K 15/02 |
| | | | | 119/719 |
| 2011/0015467 | A1* | 1/2011 | Dothie | A61B 5/11 |
| | | | | 600/26 |
| 2013/0175930 | A1* | 7/2013 | Cawman | H05B 37/02 |
| | | | | 315/158 |
| 2014/0182518 | A1* | 7/2014 | Boehm | A01K 5/0291 |
| | | | | 119/429 |
| 2017/0027131 | A1* | 2/2017 | Brownridge | A01K 1/034 |
| 2017/0086673 | A1* | 3/2017 | Donohue | A61B 5/0051 |
| 2018/0109107 | A1* | 4/2018 | Mosebrook | H02J 3/14 |

* cited by examiner

SMART PET-CRATE WITH INTERACTIVE FEATURES

CROSS-REFERENCE TO RELATED APPLICATION

This application claims the benefit of U.S. provisional patent application No. 62/236,122, filed on Oct. 1, 2015, and entitled "Music-Playing Pet Crate," the disclosure of which is expressly incorporated herein by reference in its entirety.

FIELD OF THE INVENTION

The present disclosure relates to animal enclosures, and more specifically to a pet crate that (i) adjusts the environment inside the pet crate automatically in response to an animal or a condition and (ii) provides a human a means for monitoring the animal, interacting with the animal, and/or controlling the animal's environment.

BACKGROUND

Many domesticated animals (e.g., pets) are prone to anxiety. For example, it has been estimated that over 17% of all pets suffer anxiety due loud noises (e.g., thunder). Considering that approximately 36.5% of all households in the United States own a pet, it can be estimated that more than 40 million households have pets that are prone to anxiety.

Existing treatments for animal anxiety and excitability have drawbacks. One existing anxiety treatment is medication (e.g., XANAX™, Benzodiazepines, etc.). This treatment, however, requires the animal caregiver to be present to administer the medication, which may not be possible. For example, a pet owner, while at work, may not be able to administer a drug treatment during an episode of anxiety. Further, a drug may take time (e.g., 30-60 minutes) to become effective. As a result, drug therapy may not be effective in mitigating anxiety that results from transient events (e.g., a fast moving thunderstorm, fireworks, etc.). What is more, drug therapies are considered by many as unhealthy or punitive treatments for occasional anxiety and excitability. As a result, a pet owner may be reluctant to administer drugs due to a fear of side effects or for ethical reasons.

One drug-free anxiety treatment for animals is a close-fitting jacket that provides the pet (e.g., dog, cat, etc.) comfort in times of stress. The jacket, however, may irritate or overheat an animal when worn for extended periods. As a result, an owner typically outfits the animal with the jacket in times of stress only, thereby limiting the jacket's usefulness when the owner is away from the pet. In addition, the jacket may be too heavy or cumbersome for small animals.

Another drug-free anxiety treatment for animals is sound. Calming music, for example, may help reduce an animal's stress. Calming music, however, may be difficult to hear, and as a result, ineffective in loud environments (e.g., a thunderstorm). Further, music's calming effect may be highly variable (e.g., animal and/or situation dependent). As a result, a caregiver may need to determine the most effective sounds/music for a given situation.

In each of these approaches, a human is required to determine when a pet becomes nervous/excited and to provide an appropriate response. Often, however, humans are not with pets when they are suffering from anxiety. Indeed some anxiety is caused by the fact that the owner is not with the pet. A need, therefore, exists for a means reduce an animal's anxiety without the need for the animal caregiver to be present.

SUMMARY

Accordingly, in one aspect, the present disclosure embraces a smart pet-crate. The smart pet-crate includes a housing for containing an animal that has a door and/or more openings in the housing's walls. One or more sensors (e.g., light, sound, vibration, temperature, humidity, moisture, time, proximity, etc.) are integrated with the housing and generate sensor signals in response to the animal's behavior (e.g., movement) and/or in response to the environmental conditions in or around the housing. Also integrated with the housing are environmental conditioners (e.g., speakers, fans, lights, food/water dispensers, motorized shades, fragrance dispensers, active vibration controllers, etc.) that control the environment within the smart pet-crate. An electronics subsystem integrated with the housing is communicatively coupled to the one or more sensors and the active environmental-conditioning subsystem. The electronics subsystem includes a processor that is configured by program code to monitor the sensor signals, and based on the sensor signals, the processor controls the active environmental-conditioning subsystem to produce, or change, the environment in the housing.

In an exemplary embodiment, the smart pet-crate further includes a passive environmental-conditioning subsystem (e.g., including sound insulation, vibration absorbers, etc.) that is integrated with the housing and isolates the interior of the housing from external sounds and/or vibrations.

In another aspect, the present disclosure embraces a pet care system that includes a pet crate and a computing device. The pet crate includes a multimedia interface with a microphone, a speaker, a camera, a display, or combination thereof. The multimedia interface provides computer-mediated communication (i.e., sounds, images, video, etc.) between a human located away from the pet crate and an animal inside the pet crate. The pet crate also includes environmental conditioners that control the environment within the pet crate, a computer network interface that communicates digitally with a network, a memory that stores software, and a processor. The pet crate's processor is communicatively coupled to the multimedia interface, the environmental conditioners, the computer network interface, and the memory. The processor is configured by the software to communicate with other devices on the network (via the computer network interface) and to control the multimedia interface and the environmental conditioners based on the communication. The pet care system's computing device (e.g., a mobile phone, tablet, etc.) includes a processor and a user interface. The computing device is communicatively coupled to the pet crate via a computer network. The computing device's processor is configured by program code to provide a graphical user interface to the user interface. The graphical user interface (i) enables computer-meditated communication between a human located away from the pet crate and the animal inside the pet crate, and (ii) enables control of the pet crate's environmental conditioners.

In one exemplary embodiment, the pet care system further includes a body monitor attached to the pet that is configured to detect the pet's motion and/or at least one vital function. The body monitor communicates the motion and/or the at least one vital function to the pet crate via the pet crate's computer network interface.

In another exemplary embodiment, the pet care system's pet crate includes one or more sensors communicatively coupled to the processor that is configured to monitor conditions in the pet crate. In some cases, the pet care system's processor is also configured to transmit email or text messages to the computing device based on the monitored conditions.

In another exemplary embodiment, the pet crate's environmental conditioners include a food/water dispenser configured to dispense food/water in response to an input via the GUI.

In another aspect, the present disclosure embraces a method for selecting songs from a playlist in a music-enabled smart pet-crate. The method includes providing a smart pet-crate for containing an animal. The smart pet-crate includes a proximity sensor, a music player, a speaker, and a memory that contains songs in a stored playlist. The method further includes detecting that the animal has entered the pet crate and selecting a song from a playlist for playback using the music player and the speaker, wherein the selection of the song is based on a preference score computed for each song in the playlist. The method further includes playing the song and monitoring the proximity sensor to determine if the animal is in the crate. If the animal is in the smart pet-crate and the song has finished, then a new song is selected (based on preference scores) from the playlist and the played. Alternatively, if the animal leaves the smart pet-crate before the song has finished, then the playback is stopped and the preference score for the song is reduced.

The foregoing illustrative summary, as well as other exemplary objectives and/or advantages of the disclosure, and the manner in which the same are accomplished, are further explained within the following detailed description and its accompanying drawings.

Other systems, methods, features, and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other and like reference-numerals designate corresponding parts throughout the several views.

DETAILED DESCRIPTION

Animal fear and anxiety is a common problem for domesticated animals (e.g., pets). Some fear and anxiety is a natural result of a survival instinct adapted for survival. Fear and anxiety may also result from learned experience (e.g., traumatic experience, interaction with other animal's etc.). Whatever the case, some level of fear and anxiety may be common in a domestic environment and may not result in negative behaviors. In some cases, however, an animal may have profound feelings of anxiety, fear, or excitement and may not be able to calm itself effectively. For example, time alone or transient/strange noises (e.g., thunder, fireworks, trucks, a stranger talking, etc.) may create anxious feelings that some animals find difficult to overcome. In these situations, anxious feelings may result in negative behaviors, including pacing, salivating, shaking, vomiting, destructive chewing, barking, howling, whining, urinating, defecating, harming itself, digging, and/or scratching. It is thus highly desirable to provide a means to comfort an animal in times of stress.

Many animals find comfort in an enclosure. This comfort may arise from an instinctual affinity for a natural den. As a result, den-like enclosures are often effective in providing an anxious, excited, and/or fearful animal a place of comfort and refuge in times of stress.

Many different animal enclosures exists. Animal enclosures may have a variety of shapes (crate-like, tent-like, house-like, igloo-like, etc.), may use a variety of architectural elements and ornamentation for construction (e.g., wire, mesh, screen, plastic, metal, wood, fabric, etc.), may be used for a variety of purposes (e.g., temporary confinement, voluntary access, permanent habitat, etc.), and may be used in a variety of environments (e.g., indoor, outdoor, a home, a kennel, a veterinarian office, etc.). In addition, animal enclosures may be designed/configured specifically for a variety of species (e.g., canine, feline, bovine, equine, mustelid, etc.) or for variety of breed characteristics (e.g., large, medium, small, active, slow, etc.). While it is anticipated that the features and principles of the present disclosure may be applied to any of these variations, the present disclosure describes the particular embodiment of a smart pet-crate (i.e., pet crate) that is voluntarily used by a pet animal (e.g., a dog) in a home while the owner is away. In this way, the present disclosure instructs those skilled in the art how to make and use the best mode of the invention; however, this should not be construed as limiting the scope of the invention. In addition, aspects that are conventional or commonly understood by those skilled in the art have been simplified or omitted for the purposes of efficiently teaching the inventive concepts.

Figure 1:
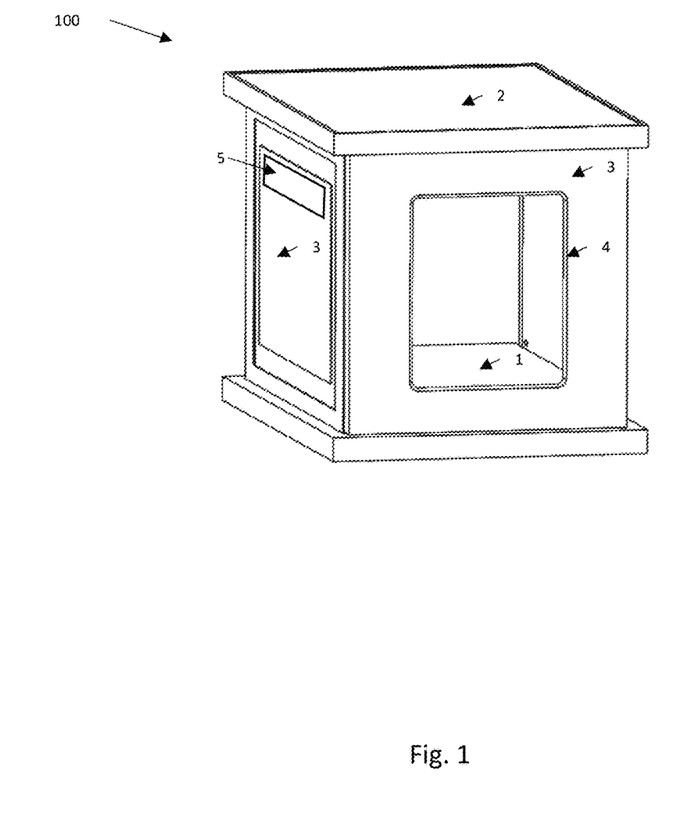
FIG. 1 is a perspective view of a smart pet crate according to an exemplary embodiment of the present disclosure.
Figure 2A:
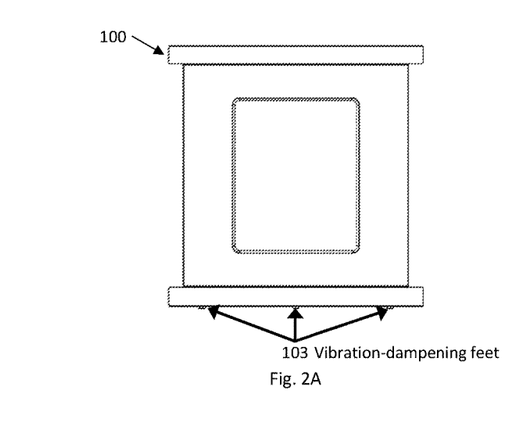
FIG. 2A is a rear side elevation view of a smart pet crate according to an exemplary embodiment of the present disclosure.
Figure 2B:
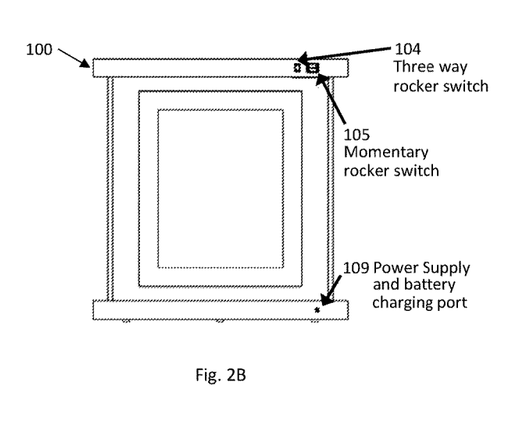
FIG. 2B is a front side elevation view of a smart pet crate according to an exemplary embodiment of the present disclosure.
Figure 2C:
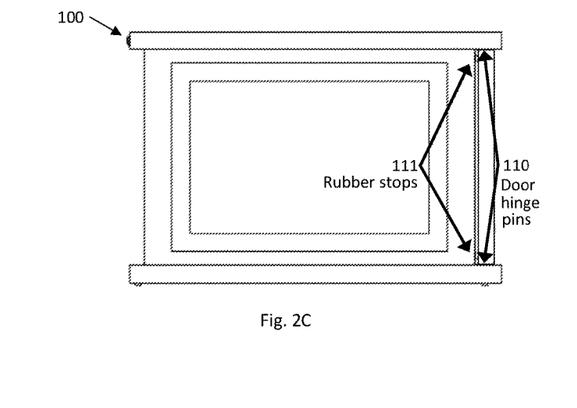
FIG. 2C is a left side elevation view of a smart pet crate according to an exemplary embodiment of the present disclosure.
Figure 2D:
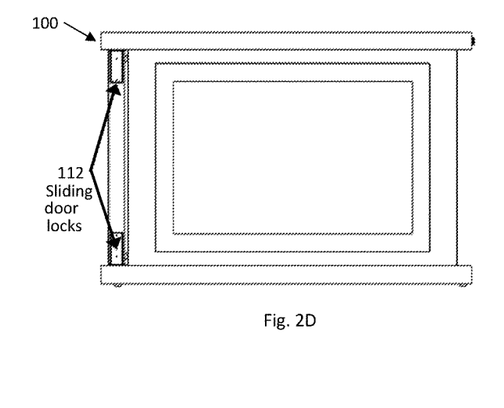
FIG. 2D is a right side elevation view of a smart pet crate according to an exemplary embodiment of the present disclosure.

An exemplary pet crate is shown in FIG. 1. The pet crate is box-shaped with a floor 1, a roof 2, and side walls 3. The six faces may be connected to each other using push-fit fasteners to facilitate assembly without tools. The housing 100 (i.e., enclosure) has a door opening 4 in which the animal may enter/exit. In a possible embodiment, the door opening may include a movable door (e.g., hinged or sliding) that may be opened or shut to prevent access to the interior of the housing. The walls of the housing may include one or more openings (e.g., windows) 5 that allow for ventilation and/or light. The windows and/or the door opening may be covered with ornamental coverings (e.g., panels) or shades (e.g., curtains, blinds, etc.). In a possible embodiment, the ornamental panels or shades may be removed and exchanged to change the look of the pet crate.

Side elevations views of the exemplary pet crate are shown in FIG. 2A-2D. As shown in the rear elevation view of FIG. 2A, the crate may rest on vibration dampening feet to isolate the interior of the crate. As shown in front elevation view of FIG. 2B, controls (e.g., three way rocker switch 104, momentary rocker switch 105 for ON, OFF, and AUTO modes), indicators (e.g., an led or liquid crystal display to show status such as ON/OFF/Charging), and ports (e.g., a power supply input/battery charging port 109) may be integrated on the crate's front surface for control. As shown in side elevation view of FIG. 2C, the crate may be configured with a hinged door and include door hinge pins 110 to enable motion and rubber stopes 111 to limit motion. As shown side elevation view of FIG. 2D the crate may be configured with a sliding door with sliding door locks 112.

As previously mentioned, an animal may retreat to its crate for comfort. In one aspect, the present disclosure embraces improving the pet's comfort to reduce anxiety by automatically adjusting the environment within the crate in response to sensed conditions. Sensed conditions may include the environmental conditions in or around (i.e., proximate to) the enclosure (e.g., light level, sound level, vibration, temperature, humidity, time of day, etc.) and/or the sensed condition of the animal (e.g., the animal's presence, the animal's behavior, and/or the animal's physiology).

The environment of the interior of the pet crate may be conditioned actively or passively. Passive environmental-conditioning adjusts the environment within the pet crate by passively changing some aspect of the environment. For example, passive environmental-conditioning may include insulating the walls of the pet crate to attenuate sound (i.e., soundproofing). The sound insulation may be embodied by applying noise absorbing material (e.g., open-cell foams, fiberglass, mineral fiber board, etc.) within the walls of the pet crate or to the interior/exterior surfaces of the walls (e.g., sound baffles).

In another example, passive environmental-conditioning may include vibration damping to reduce effects vibrations caused by thunder (e.g., 20-120 Hertz vibrations). For example, passive vibration dampening elements (e.g., damped springs, pneumatic isolators, elastomeric materials, etc.) may be added to the enclosure to isolate and/or dissipate energy in the frequency range of thunder. The damping elements may be designed with specific material properties and/or shapes to provide stiffness and damping ratios that properly dissipate vibrations between 20 and 120 Hz.

The stiffness of a disk shaped damping element may be defined from the shape-corrected Young's Modulus, $E_S$, as:

$$K = \frac{E_S \pi a^2}{t}$$

wherein a and t represent the disk radius and thickness, respectively. The stiffness of multiple damping elements in parallel may be defined as:

$$K = K_1 + K_2 + K_3 + K_4$$

while the natural frequency of the system may then be defined as $$f_n = \frac{1}{2\pi}\sqrt{K/M}$$

wherein M represents the mass of the enclosure. The energy transmitted through the damping elements may then be defined as $$T = \frac{A_{out}}{A_{in}} = \sqrt{\frac{1 + \left(2\zeta\frac{f_d}{f_n}\right)^2}{\left(1 - \left(\frac{f_d}{f_n}\right)^2\right)^2 + \left(2\zeta\frac{f_d}{f_n}\right)^2}}$$

wherein $\zeta$ represents the damping ratio, and $f_d$ represents the driving frequency (i.e., the frequency of thunder). Damping elements may be designed according to these principles to maximize the damping of vibrations in the pet crate caused by low frequency thunder.

As mentioned, the environment of the interior of the pet crate may be conditioned actively or passively. Active environmental-conditioning adjusts the environment within the pet crate by actively changing some aspect of the pet crate's environment.

In one example, active environmental-conditioning may include playing sounds (e.g., music, white noise, noise cancelling sounds, an owner's voice, nature sounds, etc.) through one or more speakers directed to interior of the pet crate. Playing sounds may mask sounds emanating from outside the pet crate (e.g., children playing, people talking, thunder, fireworks, lawn mowers, vehicles, etc.). The sounds played may be adjustable (e.g., volume, duration, content, etc.) and may be controlled (i.e., adjusted) based on a desired environment (i.e., to soothe the animal's anxiety). In some cases, the sounds played are adjusted in response to a particular stimulus (e.g., a particular time, a particular noise, the pet's behavior, as part of active noise cancellation, etc.).

In another example, active environmental-conditioning may include adjusting the lighting in the interior of the pet crate. This adjustment may be accomplish by turning on/off a light inside the pet crate (e.g., turning a light on at dusk) or by changing the intensity of a light inside the pet crate. The light or lights inside the pet crate may be embodied in a variety of ways (e.g., LED, incandescent, compact fluorescent, etc.), and when more than one light is used, each light may be controlled independently.

In another example, active environmental-conditioning may include adjusting the lighting or ventilation in the interior of the pet crate by adjusting shades covering the door and/or the one or more openings (i.e., windows) in the walls. The shades may be embodied in a variety ways (e.g., blinds, drapes, etc.). The shades may flexible or solid panels that may be raised, lowered, or otherwise separated (e.g., by a servo-controlled motor) to adjust light levels or ventilation. The shades may be automatically adjusted based on a setting and in response to a particular stimulus (e.g., a particular time, a particular light level, the pet's behavior, etc.). When a shade covers the door, a flexible fabric may be preferable to allow the animal push past the shade when entering or exiting.

In another example, active environmental-conditioning may include adjusting the temperature in the interior of the pet crate by adjusting one or more fans affixed to the pet crate. The one or more fans may circulate air within the crate, move air from the outside to the inside of the crate, or move air from the inside to the outside of the crate. The fan (or fans) may be automatically adjusted (e.g., turned on/off, rotated, speed increased/decreased, direction changed, etc.) based on a sensed temperature/humidity level or in response to a particular stimuli (e.g., a sensed time or animal behavior). Alternatively, the fan (or fans) may be manually controlled via controls on the crate or through a computing device (e.g., a mobile phone).

In another example, active environmental-conditioning may include dispensing a fragrance to the interior of the pet crate. For example, an aerosol spray of fragrance may be dispensed using a fragrance dispenser to mask scents in pet crate (e.g., urine, defecation, etc.). The fragrance may be dispensed when needed (e.g., after an animal urinates or defecates) or on a timed schedule, or manually controlled via controls on the crate or through a computing device (e.g., a mobile phone).

In another example, active environmental-conditioning may include active vibration control. This may be done to reduce the vibrations experienced inside the pet crate caused by a variety of loud and/or low frequency noise sources, including (but not limited to) thunder, trucks, motorcycles, fireworks, blasting, or guns. Active vibration control may be accomplished by resting the floor of the pet crate on piezohaptic actuators that are driven to apply forces, which are equal/opposite to the forces (e.g., measured by an accelerometer) imposed on the crate by any external source.

In another example, active environmental-conditioning may include dispensing food or water to a dispenser integrated with the crate. The dispenser may provide water at particular times, when the level of food or water drops below a level, or manually controlled via controls on the crate or through a computing device (e.g., a mobile phone).

Figure 3:
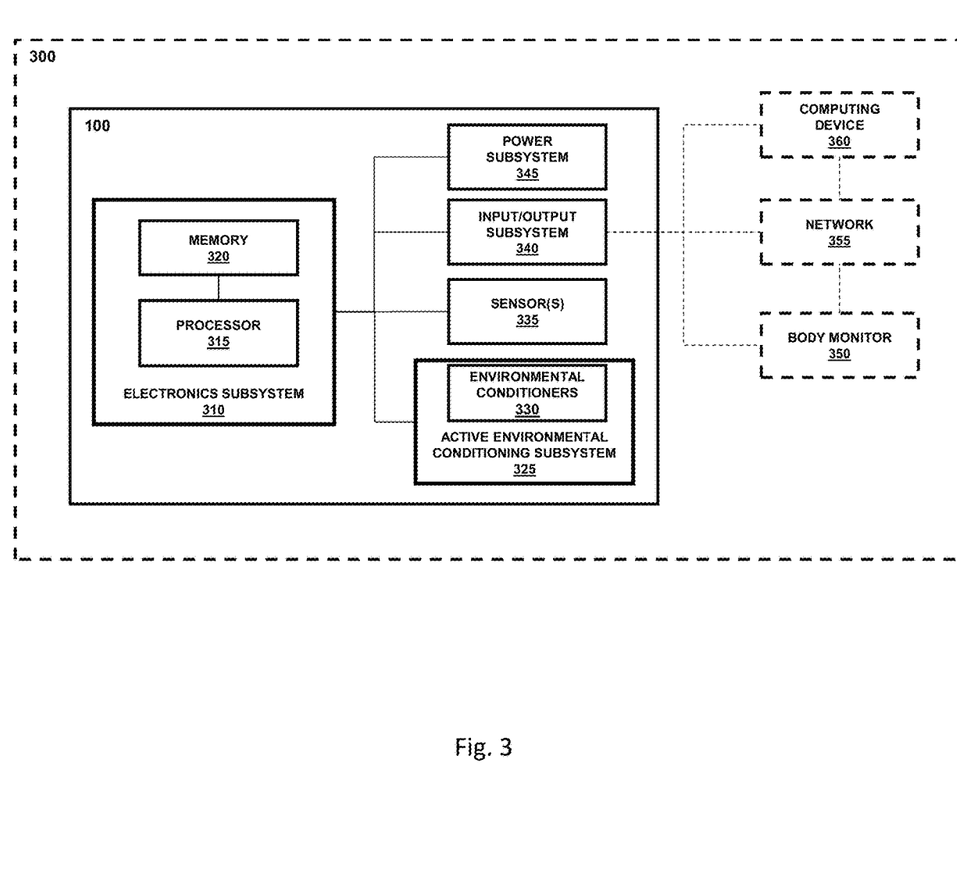
FIG. 3 is a block diagram of a smart pet crate and a pet care system according to exemplary embodiments of the present disclosure.
Figure 5A:
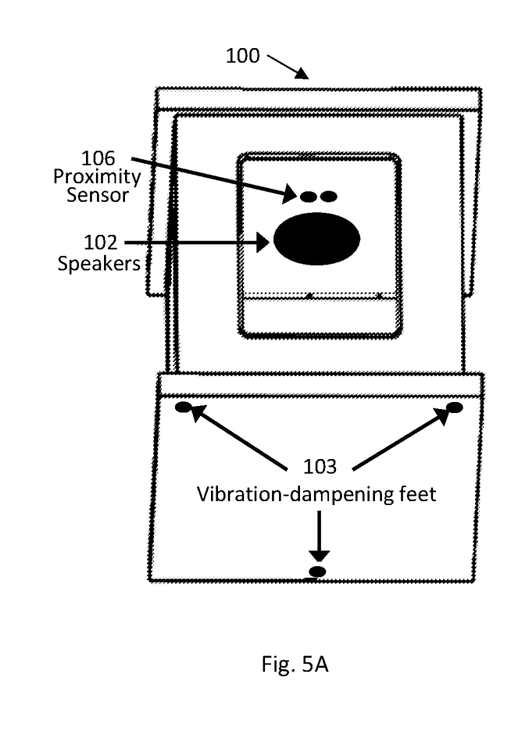
FIG. 5A is a perspective view of a smart pet crate according to an exemplary embodiment of the present disclosure.
Figure 5B:
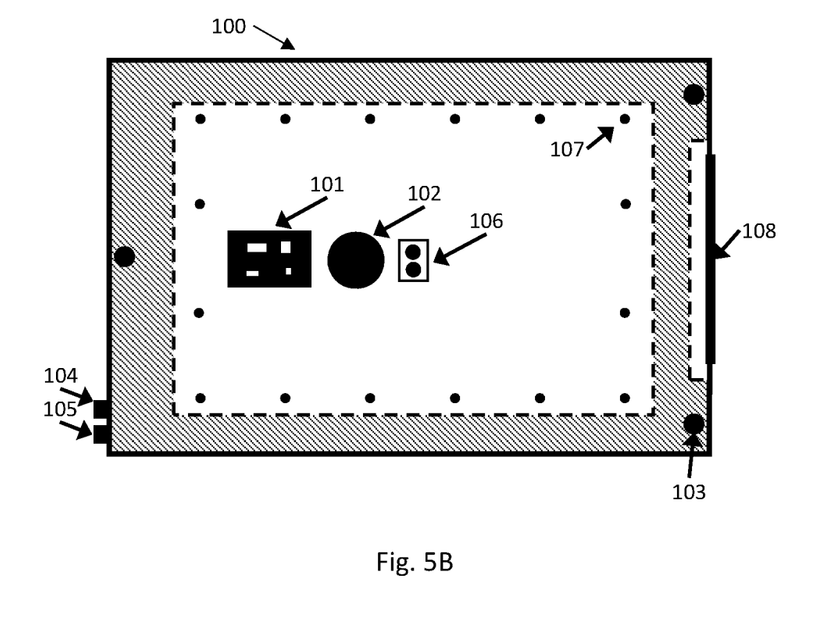
FIG. 5B is a cut away bottom view of a smart pet crate according to an exemplary embodiment of the present disclosure.

An exemplary block diagram of a pet crate with active environmental-conditioning to provide comfort for a pet is shown in FIG. 3. The pet crate includes a housing 100 with integrated electronics. For example, as shown in FIG. 5A and FIG. 5B, an electronics subsystem 310 (e.g., including an electronics board 101) may be mounted on the ceiling of the housing. The electronics subsystem 310 includes one or more processors (e.g., microprocessor, controller, ASIC, etc.) to execute program code (e.g., software, firmware, etc.) stored in a nonvolatile computer readable storage device (i.e., memory) 320 to enable the function of the pet crate. The memory 320 (e.g., hard-drive, solid state drive) may also store files (e.g., audio files for playback, configuration settings, playlists, etc.) to facilitate the environmental conditioning.

The electronics subsystem is communicatively coupled to one or more sensors 335 that monitor the pet, the pet's behavior, or the pet's environment. For example, proximity sensors 106 integrated with the housing (as shown in FIGS. 5A, 5B) and directed to the interior of the pet crate may be used to produce sensor signals that correspond with a pet entering/exiting the crate or with a pet's presence in (or absence from) the crate. Proximity sensors suitable for these purposes include (but are not limit to) ultrasonic range finders, IR temperature sensors, accelerometers (i.e., vibration sensors), passive infrared sensors (i.e., PIR sensors), and light detection and ranging sensors (i.e., LIDAR sensors). A camera may also be used to detect the entering/exiting or presence/absence of a pet.

The one or more sensors 335 may also include sensors to produce sensor signals in response to (or corresponding with) light, temperature, humidity, or moisture (e.g., urine in the crate), and may also include a clock or timer to measure time of day and/or mark periods, events, or schedules. For example, sensor signals from a clock or timer may be used to control a food/water dispenser at particular feeding times.

A processor 315 receives the sensor signals from the one or more sensors 335 and is configured by software to determine if active environmental conditioning is required and/or should be adjusted. In response to the sensor signals, the processor 315 transmits signals to control an active environmental conditioning subsystem 325. The active environmental conditioning system 325 includes environmental conditioners 330 that adjust the environment within the crate as previously described. Environmental conditioners may include speakers, lights, shades, fans, fragrance dispensers, food/water dispensers, and active vibration controllers.

The pet crate also includes a power subsystem 340 for energizing the electronics and enabling function. The power subsystem may be attached to a power grid or may function from a battery. For example, a rechargeable battery may provide power when it is needed during a power outage or during travel.

The pet crate also has an input/output subsystem 350 to allow for external control (e.g., adjustment) of the pet crate's function or for data input/output. For example, the input/output subsystem may include the necessary electronics and components for wired and/or wireless data communication with a computing device 360, a computer network (i.e., network) 355, and/or the body monitor 350. In addition, the input/output subsystem 350 may include the electronics and components necessary for manual control. In an exemplary embodiment, the pet crate may be switched to one of three different modes (i.e., ON, OFF, and AUTO) by means of an external rocker switch 104 (FIG. 5B). In the ON mode, the device may continuously play music from the internal playlist stored in memory (e.g., randomly selecting tracks). In the OFF mode, the device is disconnected from the power supply and disabled. In the AUTO mode, the device may continuously scan for the presence of an animal and automatically start streaming music from a preset playlist once an animal has been detected. In addition, a momentary rocker switch 105 may be used to adjust the volume of music playing. In an alternative exemplary embodiment, the rocker switches may include push-button or slider controls for selecting the operating mode and increasing/decreasing the volume. In addition, the input/output subsystem 350 may include a user interface for increasing/decrease the sensitivity of the sensors 335. For example, a proximity sensor may require a higher sensitivity to detect small dogs.

The input/output subsystem 350 may also include a multimedia interface comprising a microphone, a speaker, a camera, a display, or combination thereof to provide computer mediated communication between an animal inside the pet crate and a human. For example, a computing device 360 (e.g., a mobile phone) configured by software may receive video, images, and/or sound data from a human and then transmit the data to the input/output subsystem 340 (e.g., via a network 355). The processor 315, configured by software, can process the received data and transmit the process data to the multimedia interface for display and/or playback. In the same way, the processor 315 may be configured by software to enable the multimedia interface inside the housing 100 to capture video, images, and/or sound data from an animal and transmit this data to the computing device 350 for display and/or playback.

The input/output system may also enable a data link between the pet crate and the computing device 360 (e.g., via the network 355). The data link may enable the computing device to transmit software updates to the pet crate or control the pet crate's sensor/conditioner settings (e.g., music mode, music playback settings). In addition, the computing device may send/receive log reports from the pet crate (e.g., number of times animal detected by sensor, times of environmental conditioner use, etc.), videos/images from the pet crate, or text/email message alerts from the pet crate.

Figure 7:
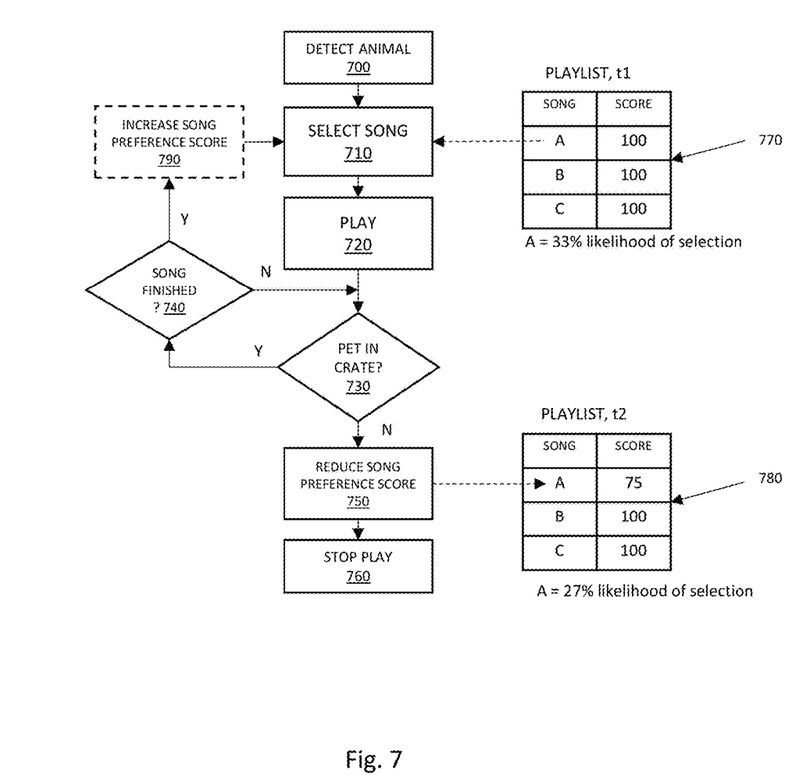
FIG. 7 is a flow diagram illustrating a method for selecting songs from a playlist for a music-enabled smart pet crate according to an embodiment of the present disclosure.

In a possible embodiment, a body monitor 350 may be attached to a pet and used for sensing the pet's behavior or health status. For attachment, the body monitor 350 may be integrated into a collar worn by the pet (as shown in FIG. 7). The body monitor 350 may measure heart rate using a light source and a detector directed at the pet's skin. The light source illuminates the pet's skin and senses the reflection to detect blood volume changes that correspond with heart rate. The body monitor 350 may also detect/measure the motion or activity (e.g., steps taken, activity levels, periods of inactivity, etc.) of the pet using an accelerometer. The body monitor 350 may also detect barking, growling, whining, yelping, or howling using a microphone. The body monitor may also detect the animal's temperature. The body monitor may communicate this information to the pet crate's electronics via a wireless communication link (e.g., BLUETOOTH, Wi-Fi, ZigBee, etc.) as shown in FIG. 7. The pet crate may store this information in memory 320 or transmit this information to the network 355 or a computing device 360, as mentioned previously. Alternatively, the information communicated to the pet crate may be processed by the pet crate's processor 315 for control of the pet crate's environmental conditioners 350. For example, the communicated information may help to determine a dog's anxiety levels. The anxiety levels may, in turn, determine the type of environmental conditioning necessary, the duration of environmental conditioning, or the settings of a particular environmental conditioner.

Figure 4:
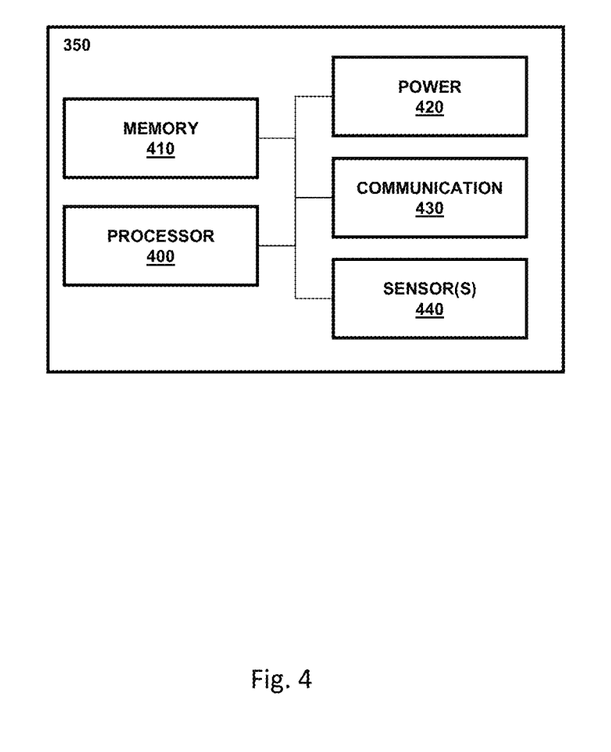
FIG. 4 is a block diagram of a body monitor for an animal according to an exemplary embodiment of the present disclosure.
Figure 6:
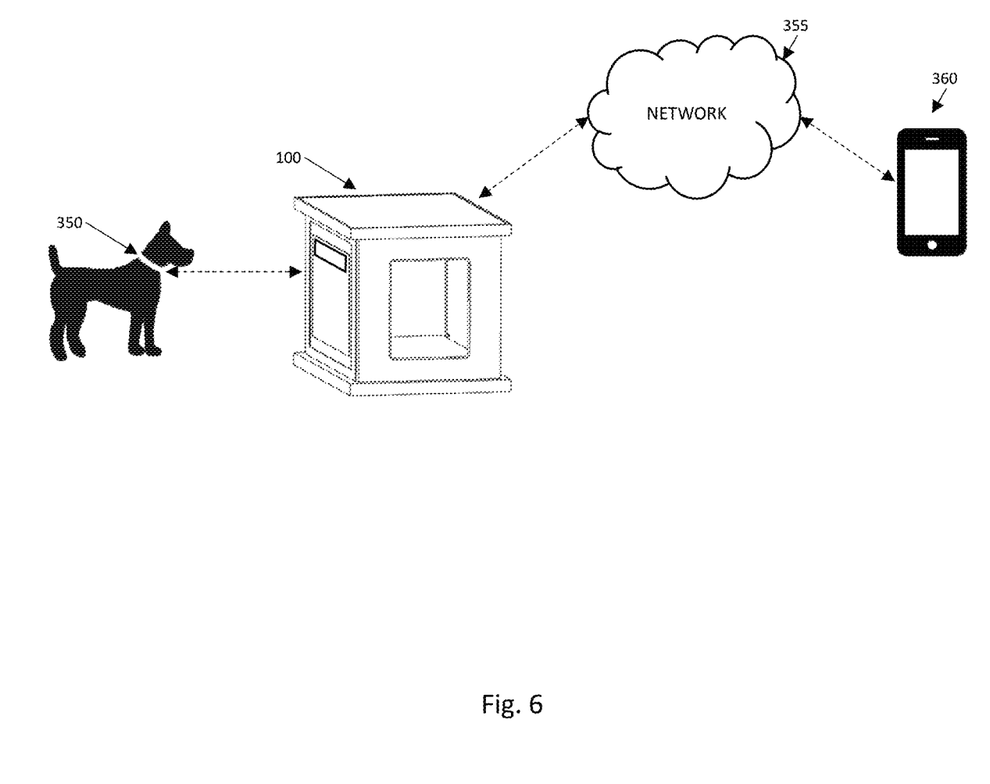
FIG. 6 is a pet care system according to an embodiment of the present invention.

An exemplary block diagram of the body monitor 350 is shown in FIG. 4. The body monitor 350 is energized by a power module (e.g., battery) 420 and includes one or more sensors 440 energized by the power module 420 to detect the pet's heart rate, temperature, activity, and/or sound. The sensors are communicatively coupled to a processor 400 that, when configured by software, monitors the sensors 440 and generates logs, alerts and/or reports. The logs, alerts, and/or reports may be transmitted to the pet crate's electronics using a wireless communication module 430. The communication module 430 includes the necessary components (e.g., processing, amplification, filtering, RF modulation, etc.) to communication with other systems via a wireless communication link (e.g., BLUETOOTH, Wi-Fi, ZigBee, etc.). Alternatively, the logs, alerts, and/or reports may be stored in a non-volatile computer readable storage medium (i.e., memory) 410 for later read-out. For example, a log of sensor readings (i.e., health/activity report) can be transmitted to the pet crate 100 at regular intervals (i.e., when the body monitor is in range with the pet crate electronics) or when a particular health condition has occurred (e.g., elevated heart rate). In this way, the pet crate 100, the body monitor 350, and the computing device (e.g., via a network) 360 may be used as a pet care system, allowing the pet owner to monitor and care for the pet (i.e., via the pet crate) while the owner is away. FIG. 6 illustrates a pet care system showing the interaction each element.

In addition to monitoring the animal's vitals, the body monitor 350 may also be configured with a sensor to sense the animal's position (e.g., a global positioning system (GPS) sensor). The location sensor may communicate the animal's position to the pet crate, which can alert the owner when a dog has entered or left a region. The body monitor 350 may also be configured with a moisture sensor. The moisture sensor may communicate that an animal has entered water to the pet crate, which can alert the owner when a dog is water (e.g., a pool, pond, etc.). The body monitor 350 may also be configured with a temperature sensor to alert that a dog has been left in a hot car, or an accelerometer or altimeter may be used to alert that a dog unusually inactive (e.g., sedated, dead, etc.).

In one possible embodiment of the present disclosure, the pet crate is music enabled. The music enabled smart pet crate begins playing sounds (e.g., music, white noise, nature sounds, etc.) when the animal enters the pet crate and stops playing sounds when the animal exits the pet crate. Playback is accomplished using a proximity sensor, a music player, a speaker, and a memory that contains songs (i.e., audio recordings, tracks, sounds, etc.) in a stored playlist.

A method for selecting songs from the playlist is shown in FIG. 7. A song is selected 710 from the playlist and played 720 when the proximity sensor detects that an animal has entered the crate 700. The song selection is selected based on a preference score assigned to each song in a playlist. For the example shown in FIG. 7, the playlist 770 includes three songs "A", "B", and "C". Each song at the start (i.e., at time t1) is assigned a preference score of 100. These scores imply that the probability that a song is selected from the playlist is 33% (i.e., song-score/total-score×100%=probability of selection). In general, songs that have a high preference score are more likely to be selected than songs with low preference scores.

The preference score for a song may be adjusted (or not) based on when the animal enters and exits the crate. For example, the score for a particular song may be reduced when the dog exits the crate while this song is playing. The amount that the score is reduced may be constant or varying based on the playing time of the song when the dog exits the crate. As shown in FIG. 7, song "A" preference score has been reduced by 25 points when the pet leaves the pet crate before the song has ended 750. As a result, the likelihood that song "A" is subsequently selected for playback is reduced to 27% in the playlist at a second time (t2) 780. In this way, the animal's preferences are learned by the music enabled pet crate.

In order to allow music songs to come back into the playlist after reaching 0 points, a fixed number of points may be added to all songs after a specified duration (e.g., 10 points are added to all songs every 10 days). Song preference scores may also be increased if a pet remains present for the entire song.

In addition to the animal entering/leaving the pet crate, physiological factors may be used to determine song selection. For example, temperature, heart rate, and/or respiratory rate may be monitored over time by a body sensor 350 to establish a baseline for a pet's typical physiological state. This state may be used to determine the effectiveness of a song in reducing the anxiety or fear-related stress of the pet. For example, the normal respiratory rate for a dog falls between 10-35 breaths per minute while at rest, and the normal heart rate falls between 60 and 140 beats per minute. The preference score for a song may be increase based on a decrease in heart rate or respiratory rate sensed during the song. In addition, the preference score for a song may be decreased based on an increase in heart rate or respiratory rate sensed during the song.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The invention claimed is:

1. A smart pet-crate comprising:
    a housing for containing an animal, wherein the housing comprises a door and one or more openings in the housing's walls;
    one or more sensors integrated with the housing and configured to generate sensor signals in response to the animal's behavior and/or environmental conditions, wherein the one or more sensors comprise a motion sensor configured to generate sensor signals corresponding the housing's motion and/or vibration;
    an active environmental-conditioning subsystem integrated with the housing and configured to activate, deactivate, enhance, diminish, or otherwise alter vibration, lighting, and/or sounds in the interior of the housing, wherein the active environmental-conditioning subsystem comprises active vibration dampers configured to attenuate the housing's motion and/or vibration; and
    an electronics subsystem integrated with the housing and communicatively coupled to the one or more sensors and the active environmental-conditioning subsystem, wherein the electronics subsystem comprises a processor configured by program code to:
        monitor the sensor signals, and
        based on the sensor signals, control the active environmental-conditioning subsystem to produce or change the environment in the housing,
        wherein the attenuation of the housing's motion and/or vibration is controlled by the electronics subsystem and based on sensor signals from at least the motion sensor.

2. The smart pet-crate according to claim 1, further comprising a passive environmental-conditioning subsystem integrated with the housing and isolating the interior of the housing from external sounds and/or vibrations.

3. The smart pet-crate according to claim 1, wherein the one or more sensors comprise a proximity sensor configured to generate sensor signals to indicate that the animal is in the housing or that the animal is not in the housing.

4. The smart pet-crate according to claim 3, wherein:
    the electronics system transmits music, white noise, and/or nature sounds to the active environmental-conditioning subsystem when the proximity sensor indicates that the animal is in the housing, and wherein
    the active environmental-conditioning subsystem comprises one or more speakers configured to play the music, white noise and/or nature sounds within the housing's interior.

5. The smart pet-crate according to claim 4, wherein the music, white noise, and/or nature sounds are retrieved from a network or a memory communicatively coupled to the electronics subsystem.

6. The smart pet-crate according to claim 1, wherein the one or more sensors comprise a light sensor configured to generate sensor signals corresponding to ambient light levels inside or outside the housing.

7. The smart pet-crate according to claim 6, wherein:
    the active environmental-conditioning subsystem comprises one or more lights configured to illuminate the interior of the housing, and wherein
    the intensity or on/off condition of the one or more lights are controlled by the electronics subsystem and based on sensor signals from at least the light sensor.

8. The smart pet-crate according to claim 6, wherein:
    the active environmental-conditioning subsystem comprises one or more motorized shades covering, at least partially, the door and/or the one or more openings, and wherein
    the extent of the covering is controlled by the electronics subsystem and based on the sensor signals from at least the light sensor.

9. The smart pet-crate according to claim 1, wherein:
    the one or more sensors comprise a time sensor configured to generate sensors signals corresponding to intervals and/or scheduled events, and wherein
    the activation/deactivation of lighting and/or sounds is controlled by the electronics subsystem and based on sensor signals from at least the time sensor.

* * * * *